United States Patent [19]
vanManen

[11] Patent Number: 4,547,954
[45] Date of Patent: Oct. 22, 1985

[54] EXTRUSION CLADDING OF BASE STRIP FOR CUSHIONED AUTOMOTIVE STRAP HANDLE

[75] Inventor: Dick T. vanManen, Canandaigua, N.Y.

[73] Assignee: Voplex Corporation, Pittsford, N.Y.

[21] Appl. No.: 510,414

[22] Filed: Jul. 1, 1983

Related U.S. Application Data

[63] Continuation-in-part of Ser. No. 211,431, Nov. 28, 1980, abandoned.

[51] Int. Cl.[4] ............... B29D 27/00; B23P 25/00
[52] U.S. Cl. .......................... 29/458; 29/527.1; 264/37; 264/45.9; 264/139; 264/148; 264/156; 264/DIG. 69
[58] Field of Search .......... 264/37, 45.9, 46.1, 264/45.5, DIG. 69, 46.4, 46.7, 156, 149, 139; 425/DIG. 46; 29/458, 527.1

[56] References Cited

U.S. PATENT DOCUMENTS

| | | | |
|---|---|---|---|
| 2,206,078 | 7/1940 | Cunnington | 105/354 |
| 3,658,971 | 4/1972 | Schickedanz | 264/45.5 X |
| 3,952,383 | 4/1976 | Moore et al. | 24/265 R |
| 3,977,054 | 8/1976 | Moore et al. | 24/265 R |
| 4,130,976 | 12/1978 | Kesseler et al. | 264/46.1 X |
| 4,152,798 | 5/1979 | Akaura et al. | 264/45.5 X |
| 4,174,988 | 11/1979 | Moore et al. | 156/213 |
| 4,409,163 | 10/1983 | vanManen | 264/45.5 |

*Primary Examiner*—Philip Anderson
*Attorney, Agent, or Firm*—Stonebraker, Shepard & Stephens

[57] ABSTRACT

A resin cladding is extruded onto a base strip 10 that is assembled into a cushioned automotive pull strap handle. This is done by feeding a continuous length of base strip 10 through an extrusion mold 12 that forms a continuous resin cladding 13 surrounding base strip 10 and providing raised shoulders 15 extending along longitudinal side edges of strip 10. Discrete strips 30 are cut from continuous strip 10 and resin cladding 13 is cut and stripped away from end regions 31 of discrete strips 30. Apertures 33 are punched in end regions 31 and discrete strips 30 are assembled into strap handles. Resin cladding 13 can also be cut and stripped away from end regions 31 before discrete strips 30 are cut from continuous strip 10.

12 Claims, 2 Drawing Figures

4,547,954

EXTRUSION CLADDING OF BASE STRIP FOR CUSHIONED AUTOMOTIVE STRAP HANDLE

RELATED APPLICATIONS

This application is a continuation-in part of my copending allowed parent application Ser. No. 211,431, filed Nov. 28, 1980, entitled METHOD FOR MOLDING A COMPOSITE FOAMED RESIN FULL STRAP and now abandoned.

BACKGROUND

Cushioned automotive strap handles are a well-developed art as best shown in Moore et al. U.S. Pat. Nos. 3,952,383; 3,977,054; and 4,174,988 and Cunnington U.S. Pat. No. 2,206,078. For the last decade or so, such handles have used a spring steel base strip with its ends formed for mounting to give the strap handle flexibility and strength. The steel strip has been assembled with a cushion and a shoulder strip wrapped within a cover that is dielectrically sealed with a seam-concealing trim strip. To help bond the assembled parts together with the dielectric seal, the steel strip has been made with a polyvinyl chloride laminate on the side where the seal is made. The shoulder strip is extruded with a groove for receiving the laminated steel strip, and the shoulder strip is assembled to the steel strip by spreading the shoulders apart to open the groove and snap the shoulder strip over the edges of the steel strip.

Besides expense, which is always an issue in manufacturing automotive components, the prior art process of making cushioned strap handles involves several unsolved problems.

The shoulder strip occasionally falls off the steel strip before assembly and must be reattached to the steel strip before the assembly can be completed. This slows down assembly operations. Also, the shoulders of the shoulder strip sometimes move transversely of the steel strip when the strap handle is subjected to twisting forces. This can displace the shoulder strip and disfigure the appearance of the strap handle.

I have devised a way of molding a shouldered cladding directly onto a steel strip to solve these problems and also reduce the expense of the strap handle. My method produces sturdy strap handles that resist harsh use and yet are less expensive to make than prior art strap handles.

SUMMARY OF THE INVENTION

I extrude a cladding on a base strip so it can be assembled into a cushioned automotive pull strap handle. To do this I feed a continuous length of the base strip through the die of an extrusion coating means to form a continuous resin cladding that surrounds the base strip and provides raised shoulders extending along longitudinal side edges of the strip. I then cut discrete strips from the continuous strip and cut and strip away the resin cladding from end regions of the discrete strips. I can also cut and strip away resin cladding from the end regions of discrete strips before cutting them from the continuous strip. Either way, I punch apertures in the end regions of the strips to ready the strips for assembly.

DRAWINGS

FIG. 1 is a schematic diagram of preferred steps for extrusion cladding a base strip assembled into a cushioned strap handle; and FIG. 2 is a schematic diagram of alternative preferred steps for extrusion cladding of base strips for cushioned strap handles.

DETAILED DESCRIPTION

Figure 1:
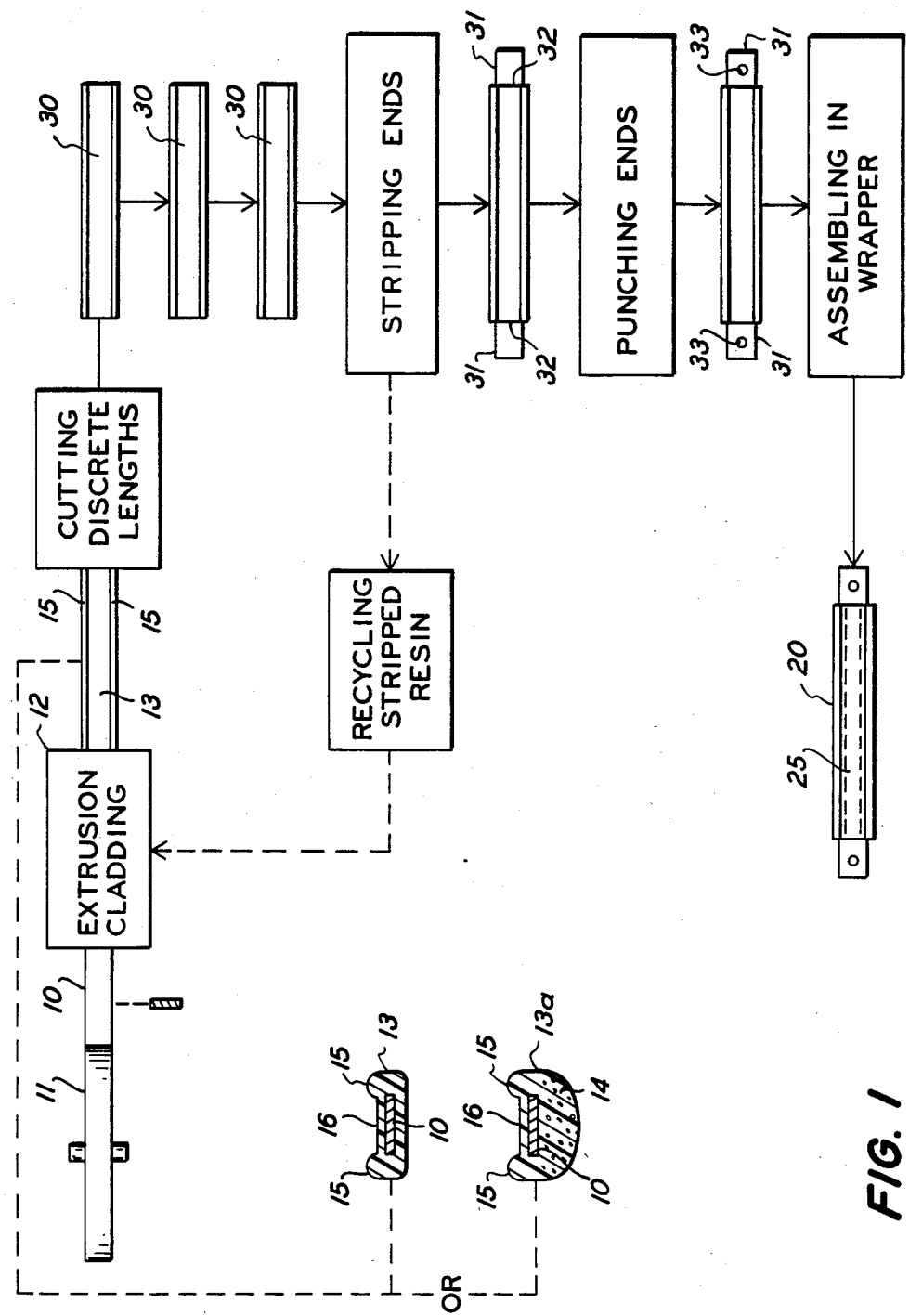

My method begins with a continuous length of a base strip 10, preferably wound in a supply coil 11. Automotive manufacturers presently require that base strip 10 be formed of spring steel, but high tensile strength resin material also appears to be feasible. My method does not require a steel strip having a resin layer laminated to one side, and it reduces costs by enabling use of bare steel.

I arrange supply coil 11 so that strip 10 passes through the die of an extrusion coating means 12 as it unwinds from coil 11, and the extrusion coating means 12 extrudes a resin cladding 13 onto strip 10. Cladding 13 is preferably formed of polyvinyl chloride, but other resins can also be used. Cladding 13 surrounds and encloses base strip 10 so that it is securely fixed on base strip 10, and it includes raised shoulders 15 extending along longitudinal side edges of strip 10. Extruding cladding 13 continuously onto base strip 10 is fast and inexpensive, and it eliminates all problems of shoulder strips being assembled onto and falling off of or moving out of position on a base strip.

Extrusion 13 is preferably 0.035 inches or less in thickness in seam region 16 between shoulders 15; and on the opposite side of strip 10 from seam region 16, extrusion 13 is preferably 0.045 inches or less in thickness. The resin in seam region 16 is available for a fusion bond to a cover 20 and a trim strip 25 in a later dielectric seal that completes the assembly.

Cladding 13 can also be formed to provide a foamed cushion 14 as shown on the side of cladding 13a opposite seam region 16. This can be done by injecting a conventional blowing agent into the extrusion coating means 12 to mix with and foam and expand the resin located on the side of strip 10 opposite shoulders 15 so that only the resin on that side of strip 10 is foamed and made cushiony. Alternatively, two resin streams can be directed into the extrusion coating means 12 so that unfoamed resin forms shoulders 15 and seam region 16 and a foamed resin forms cushion 14 on the opposite side of cladding 13a.

After cladding 13 or 13a is cured downline of the extrusion coating means 12, I cut the clad strip 10 into discrete lengths 30 that are suitable for strap handles. A cutting machine can cut strips 30 on the fly as continuous strip 10 moves steadily. Discrete strips 30 are preferably moved aside of the path of strip 10 along a transverse path proceeding toward assembly.

I then strip resin cladding 13 off of end regions 31 of discrete strips 30 by a cutting and stripping operation. I prefer cutting cladding 13 along severance lines 32 adjacent end regions 31 and then stripping cladding 13 off of each end region 31. This can be done by abrasion tools that remove cladding up to cut line 32. The removed resin is preferably recycled and remolded into fresh cladding 13.

I then punch apertures 33 in end regions 31 for mounting the eventual strap handle in place and proceed as generally known for the remainder of the assembly. If cladding 13 is not foamed to provide a cushion 14 as shown for cladding 13a, then a cushion strip is added, a cover 20 is wrapped around the assembly so that its edges lie in seam regions 16, a trim strip 25 is laid over the cover edges, and the assembly is dielectrically sealed to form a complete cushioned strap handle.

Figure 2:
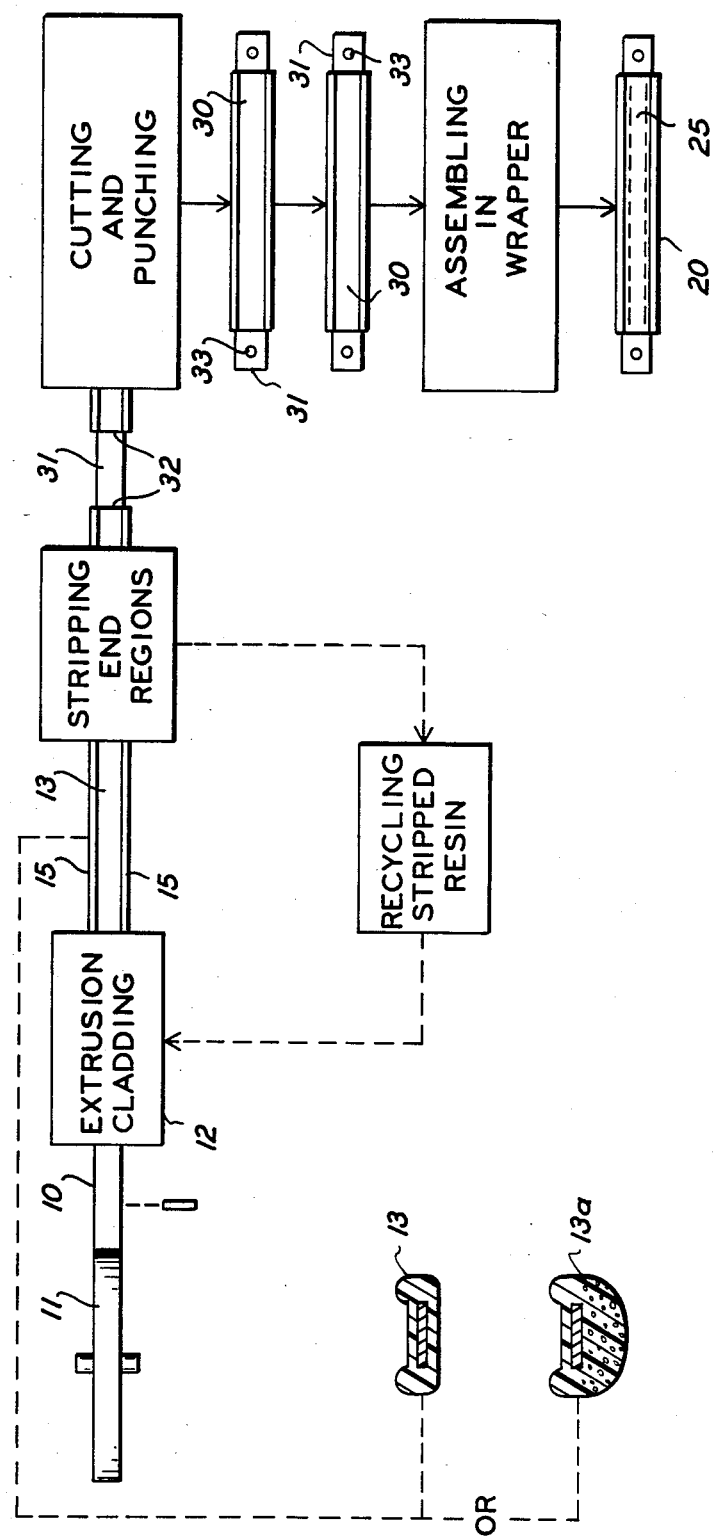

The alternative method of FIG. 2 changes the order of the stripping and cutting steps. Instead of cutting discrete strips 30 and then stripping cladding 13 from their end regions 31, I remove cladding 13 from spaced regions of strip 10 where cuts are later made to form discrete strips 30. With such an arrangement score lines 32 are made on the fly as strip 10 advances from the extrusion coating means 12, and the resin between score lines 32 is removed as strip 10 advances. Such resin removal can be abrasive or by a plowing or tearing tool that works on the advancing strip 10. Holes 33 can be punched in end regions 31 at the same time that strips 30 are severed from each other.

My method eliminates a plastic laminate on base strip 10 and thus allows a less expensive base strip 10. Extruding cladding 13 or 13a onto base strip 10 is speedy and economical and also provides a secure anchorage for shoulder 15. Cladding resin in the seam region 16 participates in a fushion bond with cover 20 and trim strip 25 so that everything is securely fixed in place in the complete handle. Foaming a cushion 14 in cladding 13a eliminates the need for a separate cushion strip. My method also keeps parts uniformly oriented during the manufacturing process to reduce the cost of parts handling. Although some of the extruded resin must be stripped away from end regions 31 of strips 30, the stripping is quick and reliable and the removed resin is recycled so that there is no waste.

I claim:

1. A method of extrusion cladding onto a base strip for assembly into a cushioned automotive pull strap handle, said method comprising:
   a. feeding a continuous length of said base strip through the die of an extrusion coating means;
   b. extrusion cladding a resin material surrounding said base strip and providing raised shoulders extending along longitudinal side edges of said strip;
   c. cutting discrete strips from said continuous strip;
   d. cutting and stripping away said resin material of said cladding from end regions of said discrete strips;
   e. punching apertures in said end regions for said discrete strips; and
   f. assembling said discrete strips within a cover to form said strap handles.

2. The method of claim 1 including cutting said discrete strips while said continuous strip advances from said extrusion coating means, and stripping said resin and punching said apertures while said discrete strips advance along a path transverse to said continuous strip.

3. The method of claim 1 including incorporating a blowing agent into a portion of said resin material of said cladding on the side of said continuous strip opposite said raised shoulders to provide a foamed cushion.

4. The method of claim 1 including recycling and reextruding said resin material stripped from said end regions.

5. The method of claim 4 including cutting said discrete strips while said continuous strip advances from said extrusion coating means, and stripping said resin and punching said apertures while said discrete strips advance along a path transverse to said continuous strip.

6. The method of claim 5 including incorporating a blowing agent into a portion of said resin material of said cladding on the side of said continuous strip opposite said raised shoulders to provide a foamed cushion.

7. A method of extruding cladding onto a base strip for assembly into a cushioned automotive pull strap handle, said method comprising:
   a. feeding a continuous length of said base strip through the die of an extrusion coating means;
   b. extrusion cladding a resin material surrounding said base strip and providing raised shoulders extending along longitudinal side edges of said strip;
   c. cutting and stripping away said resin material of said cladding from end regions of discrete strips to be cut from said continuous strip;
   d. cutting said discrete strips from said continuous strip in said end regions where said resin material of said cladding is stripped away; and
   e. assembling said discrete strips within a cover to form said strap handles.

8. The method of claim 7 including forming apertures in said end regions of said discrete strips.

9. The method of claim 7 including recycling and reextruding said resin material stripped from said end regions.

10. The method of claim 7 including incorporating a blowing agent into a portion of said resin material of said cladding on the side of said continuous strip opposite said raised shoulders to provide a foamed cushion.

11. The method of claim 10 including forming apertures in said end regions of said discrete strips.

12. The method of claim 11 including recycling and reextruding said resin material stripped from said end regions.

* * * * *